United States Patent [19]

Way, Jr.

[11] 4,203,427
[45] May 20, 1980

[54] PORTABLE SOLAR/NON-SOLAR COOKER
[76] Inventor: Lee V. Way, Jr., Rte. 4, Box 185F, Sumter, S.C. 29150
[21] Appl. No.: 972,967
[22] Filed: Dec. 26, 1978
[51] Int. Cl.² .......................... F24J 3/02; F24C 1/16; F28F 7/00
[52] U.S. Cl. ........................ 126/451; 126/9 R; 126/9 B; 126/25 R; 126/275 R; 165/137
[58] Field of Search .............. 126/451, 438, 9 R, 9 B, 126/25 R, 59, 275 R; 165/76, 80, 137

[56] References Cited

U.S. PATENT DOCUMENTS

| 3,106,201 | 10/1963 | Steinberg | 126/451 |
|---|---|---|---|
| 3,156,234 | 11/1964 | Steinberg | 126/451 |
| 3,174,476 | 3/1965 | Steinberg | 126/451 |
| 3,236,227 | 2/1966 | Steinberg | 126/451 |
| 3,896,786 | 7/1975 | Clevett | 126/451 |
| 3,938,497 | 2/1976 | Andrassy | 126/451 |
| 4,077,391 | 3/1978 | Way | 126/451 |
| 4,082,079 | 4/1978 | Rodgers | 126/451 |
| 4,125,109 | 11/1978 | Erwin | 126/451 |
| 4,130,106 | 12/1978 | Clevett et al. | 126/451 |

Primary Examiner—James C. Yeung
Assistant Examiner—Daniel J. O'Connor
Attorney, Agent, or Firm—B. B. Olive

[57] ABSTRACT

A portable, solar cooker of the type having an insulated housing with an oven compartment and associated reflector elements is adapted for cooking with a portion of the housing removed and using a conventional source of heat such as canned heat, gas-fired lantern heat, and the like.

4 Claims, 9 Drawing Figures

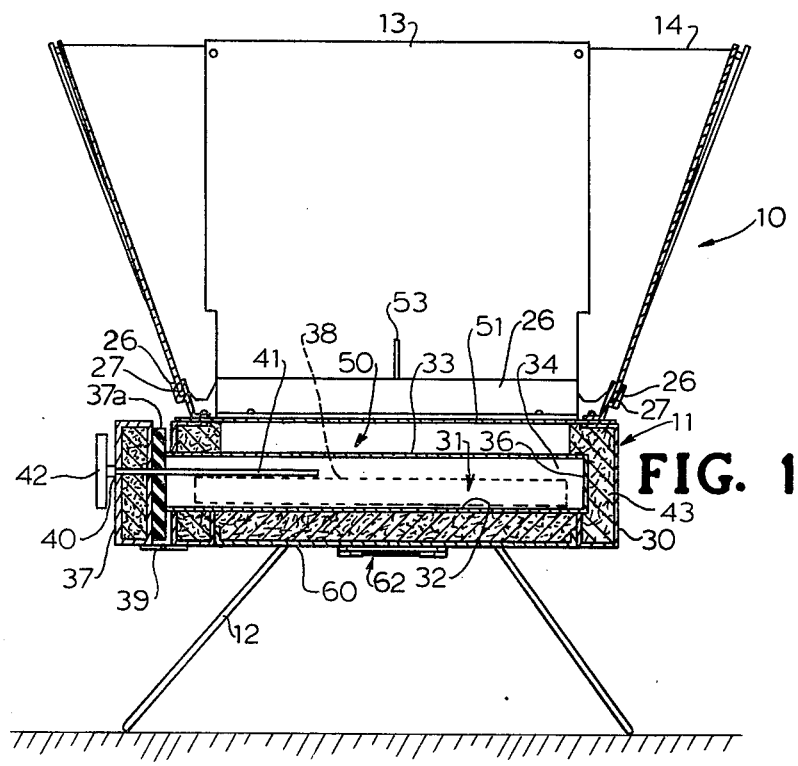
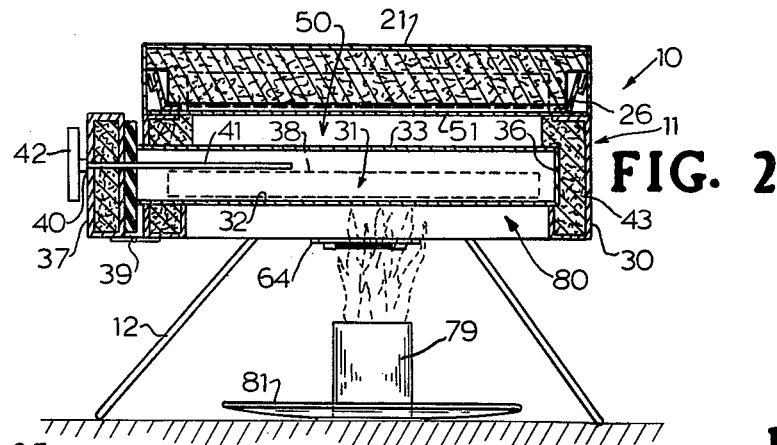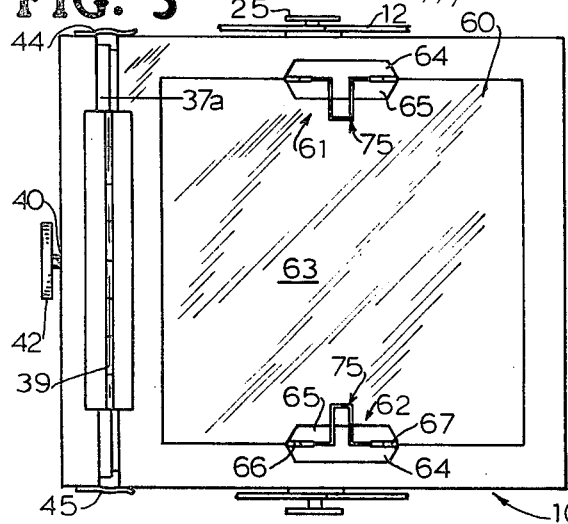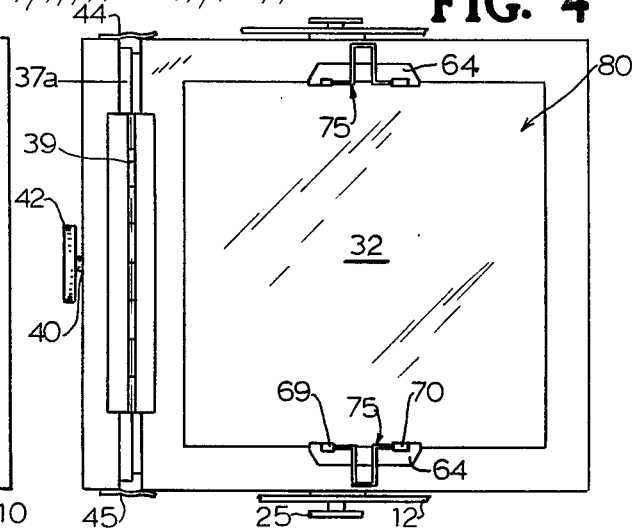

PORTABLE SOLAR/NON-SOLAR COOKER

BACKGROUND OF THE INVENTION

1. Field of the Invention

This invention relates generally to portable cooking apparatus and more particularly to a portable cooker adapted to cook using either solar energy or a conventional source of heat.

2. Description of the Prior Art

Solar cookers having a housing construction with solar energy reflectors and means for transferring the solar energy to an oven area are known and have been described in U.S. Pat. Nos. 3,025,851; 3,106,201; 3,156,234; 3,174,476; 3,236,227; 3,301,171; and 4,077,391. A further improvement on the solar cookers described in the mentioned patents is to be found in applicant's copending application Ser. No. 944,511, filed Sept. 21, 1978, and entitled "Portable Solar Cooker".

One of the shortcomings of the portable solar cookers described in the mentioned references is that in the absence of solar energy, they have no utility for cooking purposes. In particular, none of the portable solar cookers described in the mentioned references are constructed in such a manner as to allow the use of conventional sources of heat such as canned heat, gas-fired lantern heat, charcoal fires, and the like, for heating the oven.

The prior art is recognized as teaching the employment of a swingable bottom housing and the use of a permanent, auxiliary, electric resistance heater built into the portable solar cooker construction described in that patent as a means for providing the oven with heat in the absence of solar energy. However, this type of construction obviously depends upon either an available battery or other electric power source, such as a household electric outlet, in the absence of solar energy.

With the foregoing discussion of the prior art in mind, the object of the present invention is to provide an improved portable solar cooker convertible to utilization of sources of energy other than solar energy.

SUMMARY OF THE INVENTION

A portable solar cooker is provided with an internally insulated housing having a front opening and associated door and an oven compartment for slidably receiving a cooking tray or pan through the front opening. The solar cooker is adapted either for cooking with solar energy or, in the absence of solar energy, with more conventional heat sources such as canned heat, gas-fired lantern heat, electric heat and the like.

When using solar energy, the portable solar cooker of the invention is used with appropriate sun reflectors and with the reflectors oriented to insure maximum collection and transfer of solar radiation into the oven compartment for cooking purposes as taught in the previously-mentioned prior art references. When solar energy is not available, a portion of the insulated housing below the oven compartment is removed, an insulated cover is placed above the top of the oven compartment and an alternative heat source such as canned heat, a charcoal fire, gas-fired lantern heat, or electric heat is used to heat the oven compartment from below.

DESCRIPTION OF THE DRAWINGS

FIG. 1 is a side elevation view, in section, illustrating the improved solar cooker of the present invention with its removable, bottom section in place and the cooker set up for solar cooking.

FIG. 2 is a side elevation view, in section, illustrating the improved solar cooker of the invention with the sun reflectors removed, a top cover in place, the bottom housing section removed, and illustrating an auxiliary canned heat source supplying heat to the bottom of the oven compartment.

FIG. 3 is a bottom plan view of the improved solar cooker with the removable bottom section in place.

FIG. 4 is a bottom plan view of the improved solar cooker similar to FIG. 3 but with the bottom section removed.

DESCRIPTION OF THE PREFERRED EMBODIMENT

Figure 5:
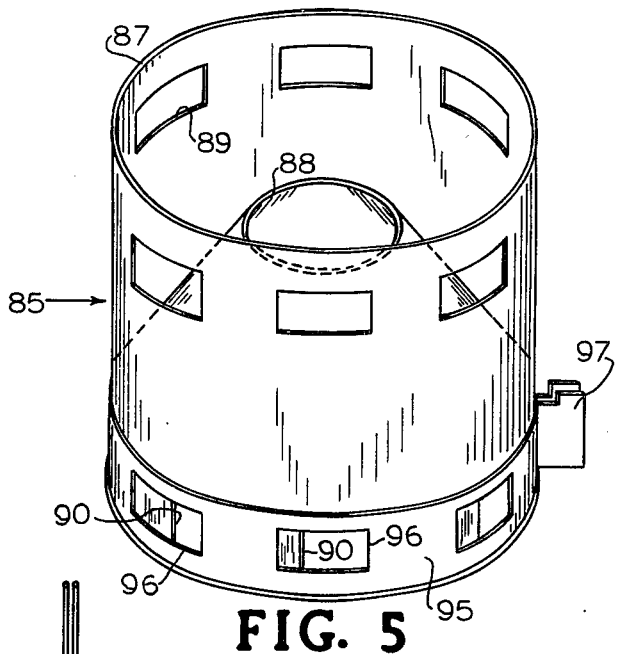
FIG. 5 is a perspective view of an auxiliary chimney for supporting the solar cooker of the invention on a standard gas-fired lantern and using the lantern as a heat source.

In FIG. 1 there is illustrated a portable solar cooker 10 comprising a generally box-like housing 11, support legs 12, removably-mounted side sun reflectors 13, and removably-mounted corner sun reflectors 14. Support legs 12 are pivotally mounted to allow cooker 10 to be tilted to a position substantially normal to the incident solar rays when it is desired to cook with the cooker 10 in an angled or tilted position and also allows for legs 12 to be utilized as a handle for carrying purposes when the cooker is not in use. Pivot/mount knobs 25 allow for loosening or tightening upon legs 12.

Housing 11 is formed by internally insulated outer walls 30 made from sheet metal, plastic or other suitable materials. Housing 11 encloses a fixed oven compartment 31 which is defined by a heat conductive bottom wall 32, a heat conductive roof or top wall 33, sidewalls 34, 35 (not shown), and back wall 36. The front side of oven 31 is closed by a door 37 which is designed to fit snugly over the front of oven 31 to form a substantially air-tight seal with the aid of a rubber seal 37a. A cooking tray 38 (shown in dashed lines) slidably fits into oven 31 by means of door 37. Door 37 pivots about hinge 39 and has a small hole 40 of diameter sufficient to receive in a sliding fit manner the shaft portion 41 of a cooking thermometer 42 for external reading of the oven temperature. As seen in the drawings, the spacing between outer walls 30 and oven compartment 31 is filled with a suitable insulating material 43 as is the inside of door 37. A pair of latches 44 and 45 secure door 37 when closed.

Referring further to FIGS. 1-4, a heat generating area 50 is situated directly above oven compartment 31. As illustrated, the sides of oven compartment 31 are surrounded by insulating material 43. The tops of each piece of insulation are cut away to receive a sheet of glazing comprising a heat shield 51 positioned parallel to oven compartment walls 32, 33 and made from a substantially clear fiberglass sheet. Heat shield 51 is appropriately secured to the top of housing 11. Shield 51 covers the opening above and overlies heat generating area 50 which, in the present embodiment, provides an air space of approximately 0.7874 inches (20 mm) in depth overlying roof 33 of oven compartment 31. The top surface of roof 33 is painted black to enhance its ability to absorb solar energy.

Briefly stated, when cooker 10 is utilizing solar energy, the solar energy is trapped under shield 51 and is transferred therethrough into heat generating area 50 and onto the black top surface of heat collecting roof 33 of oven compartment 31 and then is transmitted through roof 33 into oven compartment 31.

Brackets 26 are secured to the outer edges of the top of housing 11 and provide channels 27 for detachably and slidably receiving side sun reflectors 13 to which are attached the corner light reflector panels 14 in a manner more fully described in my previously-mentioned copending application Ser. No. 944,511, filed Sept. 21, 1978, entitled "Portable Solar Cooker". Also, as described in the prior copending application, the alignment slits 53 allow the proper orientation of the sun's rays to be determined by observing the light streaks passing through slits 53 and falling on the top side edges of housing 11 with cooker 10 being adjusted until the light streaks are perpendicular to and aligned with the slits 53.

Figure 6:
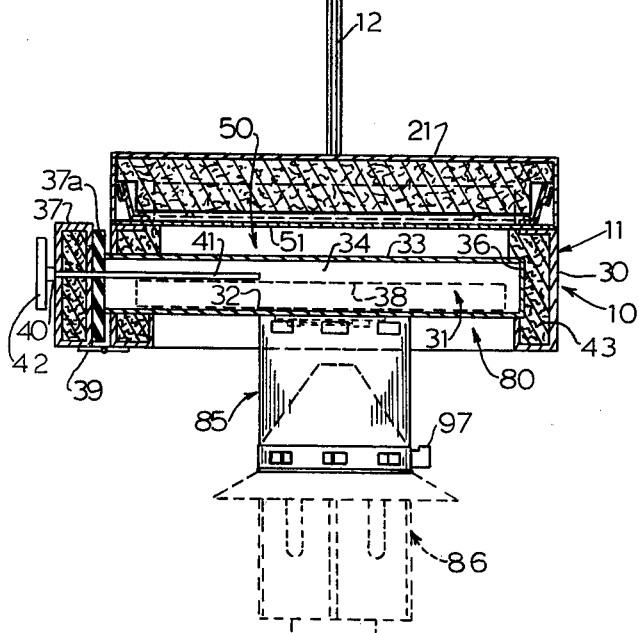
FIG. 6 is a side elevation view, in section, similar to that of FIG. 2 but utilizing the chimney of FIG. 5 and an associated gas-fired lantern.
Figure 9:
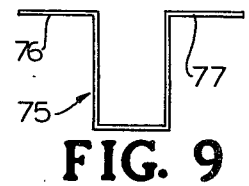
FIG. 9 is a spring-pintle member used with the latch of FIG. 8.
Figure 8:
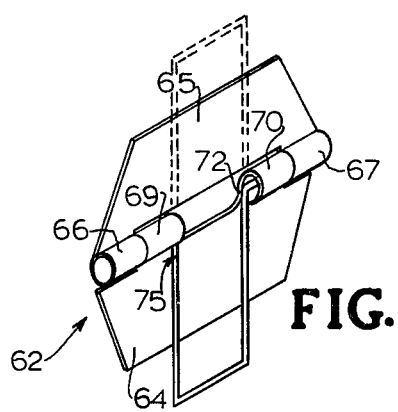
FIG. 8 is a perspective view of the type latch used to detachably secure a removable portion of the bottom of the cooker housing.

Turning now from the foregoing description which has primarily dealt with prior art construction and with continued reference to FIGS. 1-4, it will be noted that in the absence of solar energy as a heat source, the mentioned reflector panels 13, 14 may be removed and an internally insulated cover 21 installed which is shaped to fit onto housing 11 above oven compartment 31. Cover 21 acts to cover the heat shield 51 and to also minimize heat escaping from the oven compartment 31 when heated with an auxiliary source of heat as illustrated in FIGS. 2 and 6. In this regard, it will be noted that cooker 10 includes a removable bottom panel assembly 60 which can be held in position or removed by means of latches 61, 62. Alternatively, bottom panel assembly 60 may be hinged on one side to housing 11 and latched on the other side. In the form illustrated in FIGS. 3, 4, 8 and 9, latches 61, 62 each comprise a pair of hinge plates 64, 65 and a resilient spring-pintle latch member 75. Plate 65 mounts a pair of outer aligned pintle enclosures 66, 67 which are adapted to be mated and aligned with the inner pintle enclosures 69, 70 of plate 64 and shaped with camming surfaces 71 (not shown), 72. Each hinge plate 64 is suitably secured to the bottom of housing 11 and each hinge plate 65 is suitably secured to the bottom wall panel 63 of panel assembly 60. Panel assembly 60 is secured when mentioned pintle enclosures 66, 67, 69, 70 are aligned and resilient spring-pintle latch member 75 is rotated as in FIGS. 3 and 8 so as to allow the leg portions 76, 77 of spring-pintle member 75 to move to their outermost positions and, thus, join in a hinge-like arrangement plates 64, 65. It will also be understood that the removable bottom panel assembly 60 is easily removed from solar cooker 10 by rotating spring-pintle member 75 to the position illustrated in FIG. 4 and in dashed lines in FIG. 8, utilizing camming surfaces 71 (not shown), 72 to cause leg portions 76, 77 to retract and, thus, allow hinge plates 64, 65 to be separated.

Once the panel assembly 60 is removed or, if hinged, is rotated away from the bottom of housing 11, it will be noted that a compartment 80 is provided immediately below the now exposed, heat conductive bottom wall 32 of the oven compartment 31. The oven compartment 31, however, retains its fixed position and remains accessible through the front door 37. In this mode and with the insulated cover 21 installed as in FIG. 2, it will be appreciated that any suitable auxiliary source of heat may be used to heat the heat conductive bottom wall 32 of oven compartment 31 and thus provide heat to oven compartment 31 in the absence of solar energy. Also, using door 37, the food being cooked may be inspected without altering the cooker or the heat source. One such form of auxiliary heat is illustrated in FIG. 2 in which a source of canned heat 79 on a suitable support 81 is shown heating the oven compartment 31. Since canned heat is normally available in extremely lightweight containers, this provides an especially suitable form of auxiliary heat, particularly for situations where the portable cooker 10 of the invention is being transported such as during hiking, walking to remote picnic areas, and the like.

The versatility of the present invention is further illustrated with reference to FIGS. 5 and 6. FIG. 5 illustrates an auxiliary chimney 85 preferably formed of sheet metal and adapted to be mounted on a conventional gas-fired lantern 86, indicated in dashed lines in FIG. 6, so as to both heat and support the portable cooker 10 of the invention and with the legs 12 shown folded as in FIG. 6. As illustrated in FIG. 5, chimney 85 comprises an outer, open-ended cylindrical wall 87 having an inner hollow, frusto-conical shaped, heat-directing member 88 mounted so as to direct the excess lantern heat as further illustrated in FIG. 6. Appropriate upper apertures 89 and lower apertures 90 are provided in wall member 87. A rotatable band member 95 is provided with mating apertures 96 and a handle portion 97 so as to control the admission of air through the lower apertures 90. That is, as those skilled in the art will readily understand, the air control band member 95 can be rotatably positioned either to fully mate the band member apertures 96 with the lower apertures 90 of outer wall member 87 for maximum admission of ventilation air or to another appropriate rotatable position to block off the lower apertures 90 or to an immediate position, as illustrated in FIG. 5.

What is particularly noticeable about the arrangement illustrated by FIGS. 5 and 6 is that the excess heat from the widely used conventional gas-fired lantern 86 can be used with chimney 85 to provide a source of heat for the cooker 10 of the invention in the absence of solar energy. Thus, a camper may take such a conventional gas-fired lantern 86 together with the portable cooker 10 of the invention and be assured of having both a source of light at night as well as an emergency supply of heat for solar cooker 10 during daylight or night hours in the absence of solar energy. While not illustrated, it may also be noted that chimney 85 may be in an appropriate size and used with canned heat and like heat sources.

Figure 7:
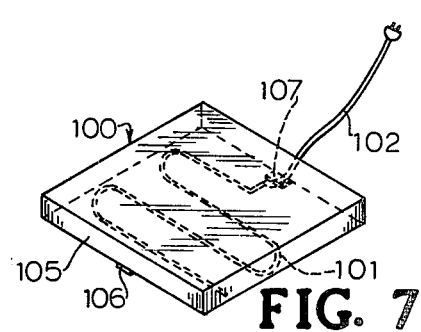
FIG. 7 is a perspective view of an auxiliary electric heat unit which may be secured below the solar cooker oven of the invention and used as a heat source in the absence of solar energy.

To further illustrate the versatility of the invention, there is illustrated in FIG. 7 a removable, electric heating element 100 having an embedded electric resistance heating element 101 with a suitable power supply connection 102. The body 105 of heating element 100 may be of an appropriate ceramic or other material suited to the purpose and is provided with latch members 106, 107 which may be of the type previously described with reference to latch members 61, 62.

While not shown, it will, of course, be understood that when the electric heating element 100 is employed in the absence of solar energy, panel assembly 60 will be removed or, if hinged, positioned to expose the oven compartment bottom wall 32. Then, electric heating element 100 will be latched into position into the exposed heating compartment 80 in which it is designed to fit below bottom 32 and with leg supports 12 extended and supporting cooker 10 as in FIG. 2. The electric power supply 102 may, of course, be connected to a suitable battery or household source of electric power such as may be available to the user of the cooker 10 of the invention. Here again, it will be noticed that irrespective of the position of panel assembly 60, the integrity of the oven compartment is maintained as well as ts accessibility. Thus, in some circumstances and while not normally contemplated both solar energy and a source of conventional heat could be used simultaneously with light reflector panels 13, 14 in place and and panel assembly 60 positioned to expose the bottom wall 32 of oven compartment 31.

In summary, it can be seen that the portable solar cooker of the invention represents an extremely significant and important advance in the art of portable solar cookers. Of growing and increasing importance to an energy-short era, the portable cooker of the invention is particularly useful in those areas of the world where one or two heated meals per day provided by solar energy are sufficient and with sunless days being rare. In such parts of the world where small fires, lamps producing excess heat, and the like, are available, it will also be seen that the solar cooker 10 of the invention is readily useful in those situations when solar energy is not available and is quickly converted from one form of energy as a source of heat to the other.

What is claimed is:

1. A portable cooker adapted for utilizing both solar and non-solar sources of heat comprising:
   (a) a housing including an internally insulated removable base member and structurally associated internally insulated front, rear and side wall portions defining an opening in the side of said housing opposite said base member;
   (b) a solar energy trapping shield member extending between said wall portions parallel to said base member and covering the opening defined thereby;
   (c) an oven compartment formed with fixedly positioned heat conductive bottom and top walls parallel to said shield member, said oven compartment being enclosed within the lower portion of said housing and positioned to provide a heat trapping compartment below said shield member and above said top wall and having positionable door means providing access to said oven compartment through one side thereof;
   (d) a light reflecting assembly removably positionable on the wall portions of said housing adjacent the edges of said shield member and adapted to direct solar radiation impinging thereon to said shield member to heat said heat trapping and over compartments;
   (e) securing means detachably securing said base member to said housing below said oven compartment enabling said base member in a first mode to be positioned below and to insulate said oven compartment bottom wall and in a second mode to be positioned to expose a major portion of said oven compartment bottom wall accessible for being heated by an external source of heat applied thereto; and
   (f) a cover detachably securable to said housing and adapted to cover said opening to reduce heat loss above said oven compartment when said light reflecting assembly is removed during utilization of said external source of heat.

2. A portable cooker as claimed in claim 1 wherein said securing means comprise latching means adapted in an unlatched position to allow said base member to be completely removed from said housing 3. A portable cooker as claimed in claim 1 including an electric heater assembly removably mountable within said housing below said oven compartment bottom wall and conforming to the space provided below said oven compartment bottom wall when said base member is positioned in said second mode.

4. A portable cooker as claimed in claim 1 including a chimney member adapted when said base member is in said second mode to have an upper end thereof contact said exposed oven compartment bottom wall with a bottom end thereof being adapted to receive heat from a said external source of heat such as canned heat, lantern heat and the like.

* * * * *